(12) United States Patent
Ohtsuka

(10) Patent No.: US 9,106,880 B2
(45) Date of Patent: Aug. 11, 2015

(54) IMAGING APPARATUS AND METHOD OF ASSIGNING FUNCTIONS TO AN OPERATING UNIT OF AN IMAGING APPARATUS

(71) Applicant: Panasonic Corporation, Osaka (JP)

(72) Inventor: Yoshio Ohtsuka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 20 days.

(21) Appl. No.: 14/075,297

(22) Filed: Nov. 8, 2013

(65) Prior Publication Data

US 2014/0132802 A1 May 15, 2014

(30) Foreign Application Priority Data

Nov. 12, 2012 (JP) ................................ 2012-248135

(51) Int. Cl.
| | | |
|---|---|---|
| *H04N 5/225* | (2006.01) | |
| *H04N 5/77* | (2006.01) | |
| *H04N 5/232* | (2006.01) | |
| *H04N 1/00* | (2006.01) | |
| *H04N 1/21* | (2006.01) | |
| *G03B 17/38* | (2006.01) | |
| *H04N 5/907* | (2006.01) | |
| *H04N 101/00* | (2006.01) | |

(52) U.S. Cl.
CPC ........... *H04N 5/772* (2013.01); *H04N 1/00387* (2013.01); *H04N 1/00389* (2013.01); *H04N 1/212* (2013.01); *H04N 5/23209* (2013.01); *H04N 5/23245* (2013.01); *H04N 5/907* (2013.01); *H04N 2101/00* (2013.01)

(58) Field of Classification Search
CPC .............. H04N 5/23245; H04N 5/343; G03B 2217/00; G03B 2217/002; G03B 17/563
USPC .......................... 348/220.1; 396/502, 540–541
See application file for complete search history.

(56) References Cited

U.S. PATENT DOCUMENTS

| | | | | |
|---|---|---|---|---|
| 6,295,088 | B1 * | 9/2001 | Tsukahara et al. | 348/333.06 |
| 6,567,618 | B2 * | 5/2003 | Kai et al. | 396/299 |
| 7,151,571 | B2 * | 12/2006 | Yip | 348/373 |
| 7,876,377 | B2 * | 1/2011 | Wang et al. | 348/373 |
| 8,223,241 | B2 * | 7/2012 | Gayer | 348/333.01 |

(Continued)

FOREIGN PATENT DOCUMENTS

| | | |
|---|---|---|
| JP | 63-574 | 1/1988 |
| JP | 63-261336 | 10/1988 |

(Continued)

*Primary Examiner* — Kelly L Jerabek
(74) *Attorney, Agent, or Firm* — Wenderoth, Lind & Ponack, LLP.

(57) ABSTRACT

An imaging apparatus comprises: an imaging unit configured to capture a subject image to generate image data; a first operating unit configured to receive a user operation; and a controller configured to execute a predetermined function according to an operation received by the first operating unit and an operation received by a second operating unit that is different from the first operating unit. The controller assigns different functions to the first operating unit and the second operating unit when executing a moving image recording process that records the image data as moving image data, and assigns the same function to the first operating unit and the second operating unit when not executing the moving image recording process.

14 Claims, 9 Drawing Sheets

(56) References Cited

U.S. PATENT DOCUMENTS

| | | |
|---|---|---|
| 2004/0165106 A1 | 8/2004 | Nakagawa |
| 2010/0208119 A1* | 8/2010 | Yoshimi et al. .......... 348/333.01 |
| 2010/0271539 A1* | 10/2010 | Ohtsuka ........................ 348/373 |
| 2011/0135272 A1 | 6/2011 | Ichii et al. |
| 2013/0329082 A1* | 12/2013 | Suzuki et al. .............. 348/231.4 |

FOREIGN PATENT DOCUMENTS

| | | |
|---|---|---|
| JP | 10-285452 | 10/1998 |
| JP | 2004-254185 | 9/2004 |
| JP | 2006-148346 | 6/2006 |
| JP | 2011-142369 | 7/2011 |
| JP | 2011-223157 | 11/2011 |

* cited by examiner

IMAGING APPARATUS AND METHOD OF ASSIGNING FUNCTIONS TO AN OPERATING UNIT OF AN IMAGING APPARATUS

BACKGROUND

1. Technical Field

The present disclosure relates to an imaging apparatus that has plural operating units and can assign functions to each of the operating units.

2. Related Art

JP-A-2011-223157 discloses an imaging apparatus as follows. While the imaging apparatus detects itself being in a vertical position, the imaging apparatus controls a recording operation based on a first imaging setting when an imaging operation command is input from a first shutter button. While the imaging apparatus detects itself being in a vertical position, the imaging apparatus controls the recording operation based on a second imaging setting when an imaging operation command is input from a second shutter button. While the imaging apparatus detects itself not being in a vertical position, the imaging apparatus controls the recording operation based on the first imaging setting when an imaging operation command is input from either the first shutter button or the second shutter button.

SUMMARY

An imaging apparatus according to the present disclosure has a plurality of operating units and improves the ease of use.

An imaging apparatus according to one aspect of the disclosure has an imaging unit configured to capture a subject image to generate image data; a first operating unit configured to receive a user operation; and a controller configured to execute a predetermined function according to an operation received by the first operating unit and an operation received by a second operating unit that is different from the first operating unit. The controller assigns different functions to the first operating unit and the second operating unit when executing a moving image recording process that records the image data as moving image, and assigns the same function to the first operating unit and the second operating unit when not executing the moving image recording process.

An imaging apparatus according to a second aspect of the disclosure has an imaging unit configured to capture a subject image to generate image data; a first operating unit configured to receive a user operation; and a controller configured to execute a predetermined function according to an operation received by the first operating unit and an operation received by a second operating unit that is different from the first operating unit. The controller assigns different functions to the first operating unit and the second operating unit, in a moving image recording mode of generating the image data as moving image to be recorded, and assigns the same function to the first operating unit and the second operating unit, in an operating mode other than the moving image recording mode.

The disclosure improves the usability of an imaging apparatus that has a plurality of operating units.

DESCRIPTION OF EMBODIMENTS

Embodiments are described below with reference to the accompanying drawings. Some detailed descriptions may be omitted as necessary or appropriate. For example, detailed description of content known from the literature, and repetitive description of effectively identical parts, may be omitted. This is to avoid unnecessary redundancy and facilitate understanding by those with ordinary skill in the related art.

The accompanying drawings and following description are provided by the inventor (s) to facilitate understanding by those skilled in the related art, and are not intended to limit the subject described in the scope of the accompanying claims.

Embodiment 1

A first embodiment is described below with reference to FIG. 1 to FIG. 6.

1. Configuration

Configuration of a digital camera is described below with reference to the accompanying drawings.

1-1. Configuration of Digital Camera

Figure 1:
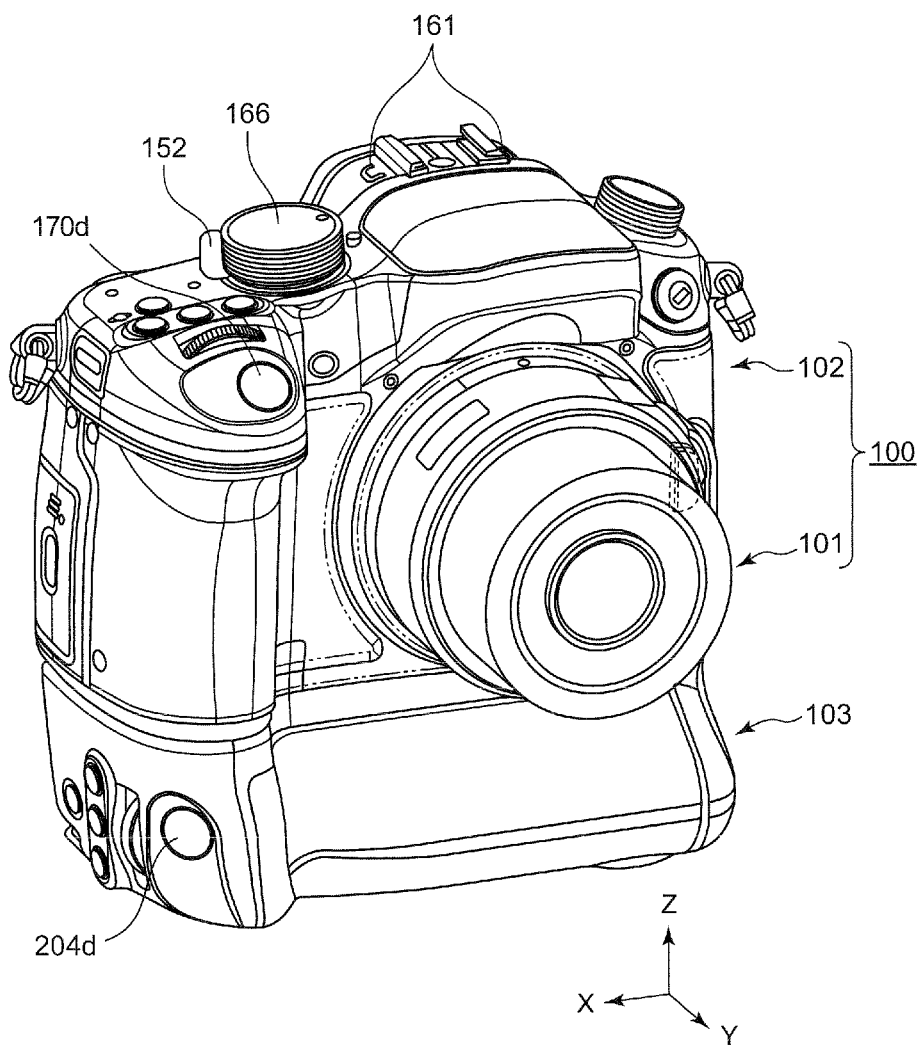
FIG. 1 is a perspective view from the front of a digital camera 100 according to a first embodiment.
Figure 2:
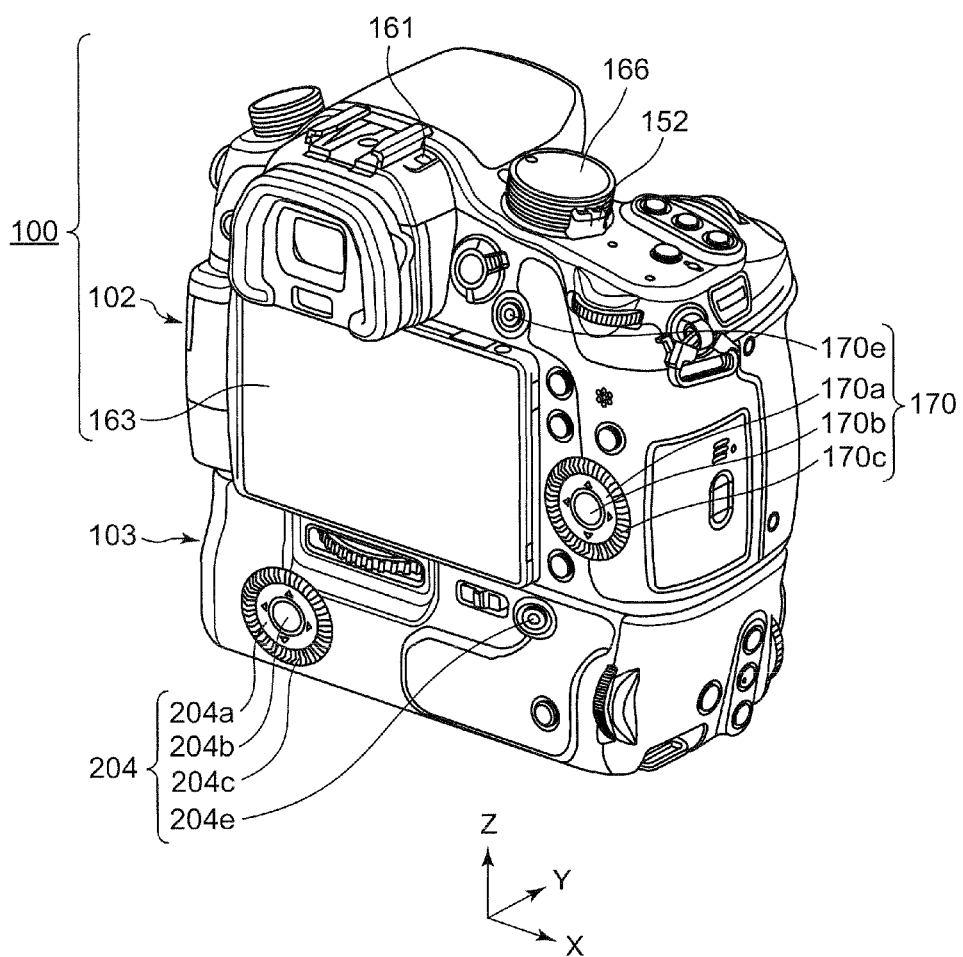
FIG. 2 is a perspective view from the back of a digital camera 100 according to a first embodiment.

FIG. 1 is a perspective view from the front of a digital camera 100 according to a first embodiment. FIG. 2 is a perspective view from the back of a digital camera 100 according to a first embodiment.

A digital camera 100 according to this embodiment has a camera body 102 and an interchangeable lens 101. A battery grip 103, which is an external battery unit, is attached to the digital camera 100 on the bottom of the camera body 102. An operating unit 170 including a plurality of buttons and dials 170a to 170e is disposed to the outside of the camera body 102. Another operating unit 204 with a plurality of buttons and dials 204a to 204e is disposed to the outside of the battery grip 103.

Figure 3:
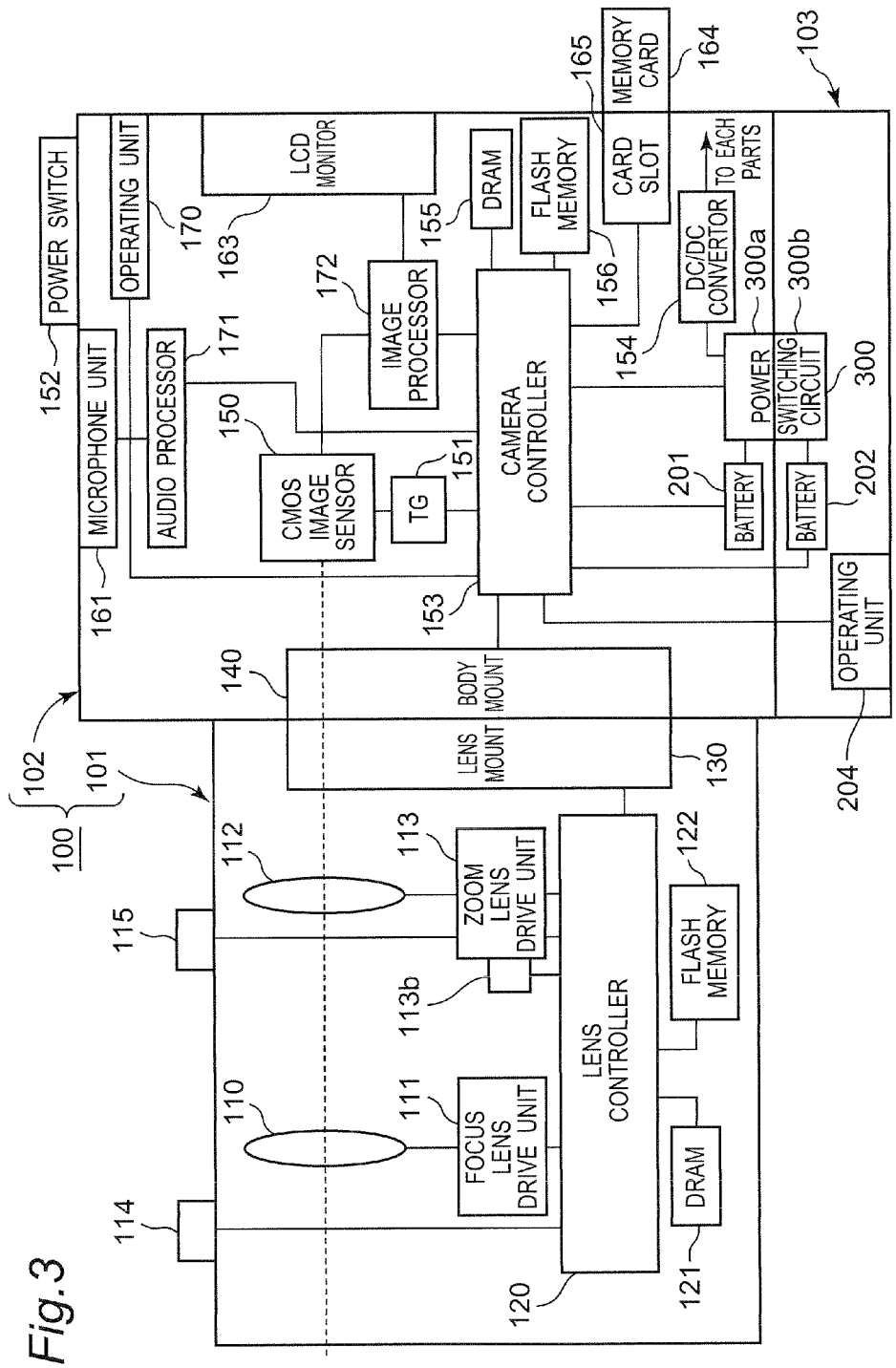
FIG. 3 is a block diagram showing the electrical configuration of a digital camera 100 according to a first embodiment.

FIG. 3 is a block diagram showing the electrical configuration of the digital camera 100 according to the first embodiment. As described above, the digital camera 100 has a camera body 102 and an interchangeable lens 101 that can be attached to the camera body 102. A battery grip 103 is also attached to the camera body 102. The interchangeable lens 101 is a zoom lens 112 that is driven by a zoom lens drive unit 113. The camera body 102 can electrically drive the zoom lens 112 through a lens controller 120. More specifically, the interchangeable lens 101 is an electric-powered zoom lens.

1-2. Configuration of Camera Body

As shown in FIG. 3, the camera body 102 includes a CMOS image sensor 150, a LCD monitor 163, an image processor 172, a timing generator (TG) 151, a camera controller 153, a body mount 140, an operating unit 170, a battery 201, a power switching circuit 300a, a DC/DC converter 154, DRAM 155, flash memory 156, a card slot 165, and an audio processor 171.

The camera controller 153 controls operation of the digital camera 100 by controlling the CMOS image sensor 150 and other parts of the digital camera 100 according to operating signals from operating members such as the operating unit 170. The camera controller 153 sends a vertical synchronization signal to the timing generator 151. Parallel to sending the vertical synchronization signal, the camera controller 153 also generates an exposure synchronization signal based on the vertical synchronization signal. The camera controller 153 periodically and repeatedly sends the generated exposure synchronization signal through the body mount 140 and lens mount 130 to the lens controller 120. As a result, the camera controller 153 can control the lens, including the focus lens 110 inside the interchangeable lens 101, synchronized to the exposure timing. The camera controller 153 uses DRAM 155 as working memory for control operations and image processing. The camera controller 153 may be configured with a hard-wired electronic circuit, or with a microprocessor that runs a program. The camera controller 153 may be embodied in a single semiconductor chip together with the image processor 172 and DRAM 155, or as a discrete semiconductor chip.

The CMOS image sensor 150 is configured to include a light-receiving element, an AGC (gain control amplifier), and an A/D converter. The light-receiving element converts optical signals gathered by the interchangeable lens 101 to electrical signals, to generate image information. The AGC amplifies the electrical signal output from the light-receiving element. The A/D converter converts the electrical signal output from the AGC to a digital signal. The CMOS image sensor 150 operates at the timing controlled by the timing generator 151. CMOS image sensor 150 operations controlled by the timing generator 151 include still image imaging operations, TTL (through-the-lens) image imaging operations, data transfer operations, and electronic shutter operations. TTL images are primarily moving images, but are also displayed on the LCD monitor 163 for the user to determine the composition when taking still images. The CMOS image sensor 150 outputs the generated image information to the image processor 172. Note that an NMOS image sensor, CCD image sensor, or other imaging means can be used instead of a CMOS image sensor 150.

The image processor 172 applies a predetermined imaging process to the image data converted to a digital signal by the A/D converter in the CMOS image sensor 150. Examples of these predetermined imaging processes include gamma correction, white balance correction, image flaw correction, color conversion, digital zooming, image compression and expansion processing, but are not limited thereto.

The microphone unit 161 converts picked up sound or voice to an audio signal which is an electrical signal, to output the audio signal. The audio processor 171 receives the audio signal output from the microphone unit 161, and applies a predetermined audio process to the received audio signal. The predetermined audio process may include but is not limited to a gain multiplication process that multiplies the audio signal by the microphone gain setting set by the camera controller 153, a frequency characteristic correction process that corrects the frequency characteristic of the audio signal, a directivity synthesis process that shapes the directivity of the microphone unit 161, and a noise suppression process that suppresses noise in the audio signal.

The noise suppression process may include but is not limited to suppressing noise from operating optical elements in the interchangeable lens 101, and suppressing wind noise.

The camera controller 153 receives the audio data converted to a digital signal by the A/D converter in the audio processor 171, and applies a predetermined process to the received audio data. This predetermined process may include but is not limited to a moving recording process that synchronizes the image data from the image processor 172 with the audio data from the audio processor 171 and records moving image to a memory card 164. Note that the microphone unit 161 could comprise a plurality of microphone elements. The microphone unit 161 could also include a microphone element external to the camera body 102.

The LCD monitor 163 is a display unit disposed on the back of the camera body 102. The LCD monitor 163 displays an image based on the image information processed by the image processor 172 for display. The LCD monitor 163 can selectively display moving image and still images. The LCD monitor 163 can also display images for presenting digital camera 100 settings and other information to the user.

The camera body 102 in this embodiment has an LCD monitor 163 as an example of a display unit, but the display unit is not limited thereto. For example, the camera body 102 could have an OLED display as the display unit.

The flash memory 156 functions as internal memory for storing image information. The flash memory 156 also stores programs and parameters used for control by the camera controller 153.

The card slot 165 is a connection means enabling installing a memory card 164 in the camera body 102. The card slot 165 enables electrically and mechanically connecting a memory card 164. The card slot 165 could also have a function for controlling the memory card 164.

A memory card 164 is an external memory device having internal flash memory or other storage device. The memory card 164 can store image information and other data processed by the camera controller 153. The memory card 164 can also output the internally stored image information and other data. Image data read from the memory card 164 is processed by the camera controller 153 and image processor 172, and displayed on the LCD monitor 163, for example. A memory card 164 is used as an example of external memory in this embodiment, but the external memory is not limited thereto. An optical disc or other recording medium can also be used as external memory.

The body mount 140 enables electrically and mechanically connecting with the lens mount 130 (described below) of the interchangeable lens 101. The body mount 140 passes data between the camera body 102 and interchangeable lens 101 through the lens mount 130. The body mount 140 sends the exposure synchronization signal received from the camera controller 153 and other control signals through the lens mount 130 to the lens controller 120. The body mount 140 also sends signals received through the lens mount 130 from the lens controller 120 to the camera controller 153.

A battery 201 supplies power for driving the digital camera 100. The battery 201 may be a dry cell battery or a rechargeable battery. Power supplied through a power cord from an external power source could also be supplied to the digital camera 100 instead of using a battery 201.

The power supply of the digital camera 100 can be turned on and off by the user operating a power switch 152. When the power is on, the camera controller 153 supplies power to parts of the camera body 102. The camera controller 153 also supplies power to the interchangeable lens 101 through the body mount 140 and lens mount 130. Inside the interchangeable lens 101, power is supplied to parts of the interchangeable lens 101 by the lens controller 120.

The power switching circuit 300a of the camera body 102 is part of a power switching circuit 300. The power switching circuit 300a and a power switching circuit 300b in the battery grip 103 together render the power switching circuit 300. The power switching circuit 300 switches supplying power to the digital camera 100 between the battery 201 in the camera body 102 and a battery 202 in the battery grip 103 as described below. The power switching circuit 300 outputs power from the selected battery to the DC/DC converter 154. The power switching circuit 300 is controlled by the camera controller 153.

The DC/DC converter 154 supplies power from the power switching circuit 300 to other parts (loads) of the digital camera 100. When supplying power to other parts, the DC/DC converter 154 adjusts the voltage from the battery to a voltage appropriate to the part to which the power goes.

The operating unit 170 includes a cross button 170a that controls vertical and horizontal selections. When an interchangeable lens 101 with a power zoom function is installed to the camera body 102, the camera controller 153 assigns zooming functions to the left button and right button of the cross button 170a. For example, the camera controller 153 assigns a wide-angle zoom function to the left button, and a telephoto zoom function to the right button. If the interchangeable lens 101 with a power zoom function installed to the camera body 102 has a zoom lever (operator) that is operated by the user to zoom, the camera controller 153 does not necessarily need to assign the function of a zoom button to the operating unit 170.

The operating unit 170 also has a menu button 170b for displaying a setup menu on the LCD monitor 163. The function of a selection button for determining a setting in the setup menu may be assigned by the camera controller 153 to the menu button 170b.

The operating unit 170 also has a rotary dial 170c as a means for configuring settings in addition to the cross button 170a. The user can use the cross button 170a or the rotary dial 170c of the operating unit 170 to select menu items and enter parameter values in the setup menu displayed on the LCD monitor 163.

When the setup menu is displayed and the camera controller 153 detects user operation of the cross button 170a, menu button 170b, rotary dial 170c, or other control, the camera controller 153 changes the display accordingly. For example, the camera controller 153 changes the screen displayed on the LCD monitor 163 to a setup menu at a deeper level in the menu hierarchy than the setup menu already displayed. The user can then select the desired setting from among the menu items displayed on the new screen.

A mode selection switch 166 is disposed on the top of the camera body 102. The mode selection switch 166 is a switch for selecting either a recording standby mode of displaying the moving image signal output from the CMOS image sensor 150 through the image processor 172 on the LCD monitor 163, or a playback mode of reproducing a still image or moving image recorded on the memory card 164.

The operating unit 170 also includes a still image release button 170d for starting recording a still image. The still image release button 170d receives an image command or an autofocus command from the user. The still image release button 170d has two operating positions, partially depressed and fully depressed. For example, when the still image release button 170d is partially depressed by the user, the camera controller 153 performs the autofocus operation. When the still image release button 170d is fully depressed by the user, the camera controller 153 records the image data generated at the time the button is fully depressed to the memory card 164.

The operating unit 170 also has a moving image release button 170e that starts and stops a moving image recording. If the moving image release button 170e is depressed when moving image is not being recorded, the digital camera 100 starts a moving image recording. If the moving image release button 170e is depressed when moving image is being recorded, the digital camera 100 stops the moving image recording.

1-3. Configuration of Interchangeable Lens

As shown in FIG. 3, the interchangeable lens 101 has an optical system including a focus lens 110 and a zoom lens 112, a focus lens drive unit 111, a focus ring 114, a zoom lens drive unit 113 including a zoom lens position detector 113b, a zoom ring 115, a lens controller 120, DRAM 121, flash memory 122, and a lens mount 130. The optical system of the interchangeable lens 101 may further include an image stabilization lens in addition to the focus lens 110 and zoom lens 112 shown in FIG. 3.

The lens controller 120 controls operation of the interchangeable lens 101. The lens controller 120 may be configured with a hard-wired electronic circuit, or with a microprocessor that runs a program.

DRAM 121 is used by the lens controller 120 as working memory for lens control. The program, parameters, and lens data used for control by the lens controller 120 is stored in flash memory 122. The lens data includes values specific to the interchangeable lens 101, such as the lens name, lens ID, serial number, f-number, and focal length. As described below, the lens controller 120 reports the lens data to the camera controller 153, and the camera controller 153 can perform control operations based on the lens data.

The zoom lens 112 is a lens for changing the magnification of the subject image formed by the optical system of the interchangeable lens 101. The zoom lens 112 may be built with any number of lenses or lens groups.

Based on user operation of the zoom ring 115, the zoom lens drive unit 113 mechanically moves the zoom lens 112 along the optical axis of the optical system. The position of the zoom lens 112 is detected by the zoom lens position detector 113b, and reported to the lens controller 120.

The focus lens 110 is a lens for changing the focus of the subject image formed on the CMOS image sensor 150 through the optical system. The focus lens 110 may be built with any number of lenses or lens groups.

The focus ring 114 is disposed to the outside of the interchangeable lens 101. When the user operates the focus ring 114, information related to the distance the focus ring 114 moves is reported to the lens controller 120. The lens controller 120 controls the focus lens drive unit 111 and drives the focus lens 110 based on the reported information related to the distance the focus ring 114 moved. As a result, the lens controller 120 knows the position of the focus lens 110.

The focus lens drive unit 111 drives the focus lens 110 forward or back along the optical axis of the optical system as controlled by the lens controller 120. The focus lens drive unit 111 may be realized by using a stepper motor, DC motor, or ultrasonic motor, for example.

1-4. Configuration of Battery Grip

As shown in FIG. 3, the battery grip 103 includes a battery 202, power switching circuit 300b, and operating unit 204.

A battery 202 supplies power for driving the digital camera 100. The battery 202 could be a dry cell battery or a rechargeable battery. Power supplied through a power cord from an external power source could also be supplied to the digital camera 100 instead of using a battery 202.

The power supply of the digital camera 100 can be turned on and off by the user operating the power switch 152. When the power is on, the camera controller 153 supplies power to parts of the camera body 102. The camera controller 153 also supplies power to the interchangeable lens 101 through the body mount 140 and lens mount 130. Inside the interchangeable lens 101, power is supplied to parts of the interchangeable lens 101 by the lens controller 120.

The power switching circuit 300b is part of the power switching circuit 300. The power switching circuit 300 switches supplying power to the digital camera 100 between the battery 201 in the camera body 102 and the battery 202 in the battery grip 103. The power switching circuit 300b is controlled by the camera controller 153.

The operating unit 204 includes a cross button 204a that controls vertical and horizontal selections, and a rotary dial 204c that can be rotated clockwise and counterclockwise. When an interchangeable lens 101 with a power zoom function is installed to the camera body 102, the camera controller 153 assigns zooming functions to the left button and right button of the cross button 204a. For example, the camera controller 153 assigns a wide-angle zoom function to the left button, and a telephoto zoom function to the right button. If the interchangeable lens 101 with a power zoom function installed to the camera body 102 has a zoom lever (operator) that is operated by the user to zoom, the camera controller 153 does not necessarily need to assign the function of a zoom button to the operating unit 204.

When seen from the camera back, the cross button 204a, rotary dial 204c, and other buttons of the operating unit 204 on the battery grip 103 are disposed at a position rotated 90 degrees clockwise around the optical axis of the interchangeable lens 101 of the digital camera 100 from the operating unit 170 of the camera body 102. As a result, operation when the user holds the camera body 102 and operates the operating unit 170 to take a still image horizontally (in a landscape mode, the position of the digital camera 100 when the z-axis in FIG. 1 is pointing up), and operation when the user holds the battery grip 103 and operates the operating unit 204 to take a still image vertically (in a portrait mode, the position of the digital camera 100 when the x-axis in FIG. 1 is pointing up), are substantially the same. Operation is therefore similar when holding the camera body 102 and when holding the battery grip 103, and ease of use can be improved for the user.

When the user records moving image, the digital camera 100 is normally held in the horizontal landscape position. When the user records moving image, operation therefore does not necessarily need to be the same when the user holds the camera body 102 (landscape mode) and when the user holds the battery grip 103 (portrait mode).

The operating unit 204 also has a menu button 204b for displaying a setup menu on the LCD monitor 163. The function of a selection button for determining a setting in the setup menu may be assigned by the camera controller 153 to the menu button 204b.

The camera controller 153 also assigns the functionality of a means for configuring settings to the rotary dial 204c in addition to the cross button 204a. The user can use the cross button 204a or the rotary dial 204c to select menu items and enter parameter values in the setup menu displayed on the LCD monitor 163.

When the setup menu is displayed and the camera controller 153 detects user operation of the cross button 204a, menu button 204b, rotary dial 204c, or other control, the camera controller 153 changes the display accordingly. For example, the camera controller 153 changes the screen displayed on the LCD monitor 163 to a setup menu at a deeper level in the menu hierarchy than the setup menu screen already displayed. The user can then select the desired setting from among the menu items displayed on the new screen.

The battery grip 103 could also have a mode selection switch for selecting either a recording standby mode of displaying the moving image signal output from the CMOS image sensor 150 through the image processor 172 on the LCD monitor 163, or a playback mode of reproducing a still image or moving image recorded on the memory card 164.

The operating unit 204 also includes a still image release button 204d for starting recording a still image. The still image release button 204d receives an image command or an autofocus command from the user. The still image release button 204d has two operating positions, partially depressed and fully depressed. For example, when the still image release button 204d is partially depressed by the user, the camera controller 153 performs the autofocus operation. When the still image release button 204d is fully depressed by the user, the camera controller 153 records the image data generated according to the time the button is fully depressed to the memory card 164.

The operating unit 204 also has a moving image release button 204e that starts and stops a moving image recording. If the moving image release button 204e is depressed when moving image is not being recorded, the digital camera 100 starts a moving image recording. If the moving image release button 204e is depressed when moving image is being recorded, the digital camera 100 stops the moving image recording.

The still image release button 204d of the operating unit 204 is disposed to the right side of the battery grip 103 as shown in FIG. 1. The still image release button 204d of the operating unit 204 of the battery grip 103 is thus disposed to a different surface than the top of the camera body 102 where the still image release button 170d of the operating unit 170 is disposed. Yet more specifically, the still image release button 204d of the operating unit 204 of the battery grip 103 is disposed to a position rotated approximately 90 degrees around the optical axis of the interchangeable lens 101 of the digital camera 100 from the position of the still image release button 170d of the operating unit 170 on the camera body 102.

The cross button 204a, menu button 204b, rotary dial 204c, and moving image release button 204e of the operating unit 204 are located on the back of the battery grip 103. More specifically, the cross button 204a, menu button 204b, rotary dial 204c, and moving image release button 204e of the operating unit 204 of the battery grip 103 are disposed to a position rotated approximately 90 degrees around the optical axis of the interchangeable lens 101 of the digital camera 100 from the position of the cross button 170a, menu button 170b, rotary dial 170c, and moving image release button 170e of the operating unit 170 on the camera body 102.

1-5. Hierarchy of Setup Menu

The hierarchical structure of the setup menus is described below with reference to FIG. 4A to FIG. 4E. FIG. 4A to FIG. 4E show an example of the transition of the setup menus displayed on the LCD monitor 163 in FIG. 2. The setup menus are used to configure various settings of the digital camera 100.

The microphone gain setting (audio input level) is a setting that is used during moving image recording and is not used during still image recording, and the menu for setting the microphone gain is deep in the menu hierarchy. For the user to set the microphone gain while in the recording standby mode, the user needs to operate buttons or dials on the camera body 102 or the battery grip 103 multiple times to follow down the menu hierarchy in order to reach the predetermined menu for setting the microphone gain. This is described with reference to FIG. 4A to FIG. 4E.

Figure 4A:
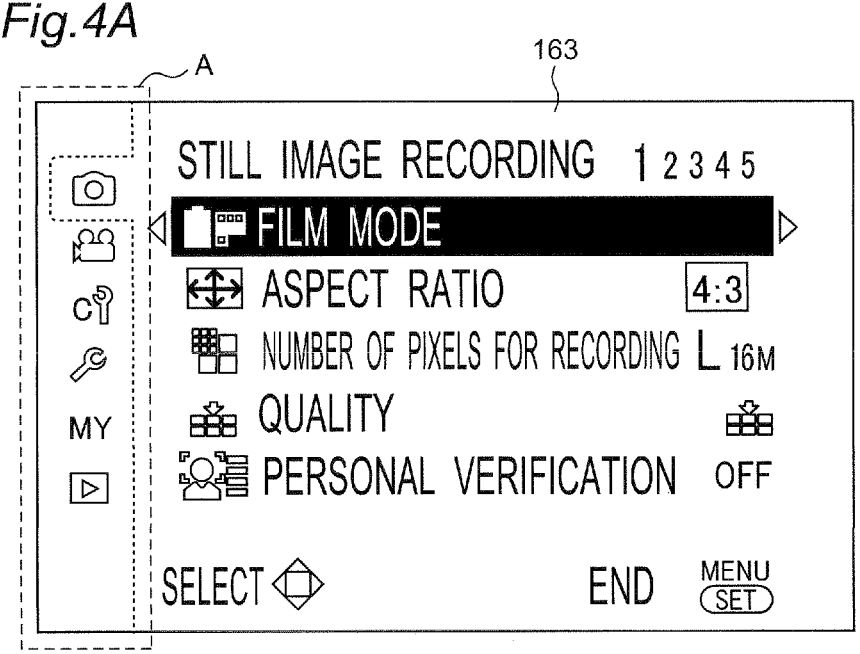
FIG. 4A shows an example of a setup menu displayed on the LCD monitor 163 of a digital camera 100 according to a first embodiment.

When the camera controller 153 detects that the user pressed the menu button 170b on the camera body 102 or the menu button 204b on the battery grip 103, the camera controller 153 displays the setup menu shown in FIG. 4A on the LCD monitor 163. The setup menu shown in FIG. 4A is a menu for receiving selection of settings related to still image recording, such as "FILM MODE" and "ASPECT RATIO". Plural icons corresponding to plural genres of settings related to digital camera 100 operation are also displayed in the genre selection area A provided on the left side of the setup menu screen shown in FIG. 4A. The icon for still image recording is selected in the genre selection area A in FIG. 4A, and is displayed differently than the other icons.

In order to set the microphone gain used for moving image recording, the user needs to change the setup menu screen (FIG. 4A to FIG. 4D) by changing the setup menu through the hierarchy of setup menus as described below. In order to move to a higher level in the setup menu screen shown in FIG. 4A, the user performs a predetermined operation on the cross button 170a or 204a of the camera body 102 or battery grip 103, for example, pressing the left button. When the camera controller 153 detects such an operation, the camera controller 153 changes the level of the setup menu up by one level, enabling the user to select a genre of digital camera 100 settings in the genre selection area A.

Figure 4B:
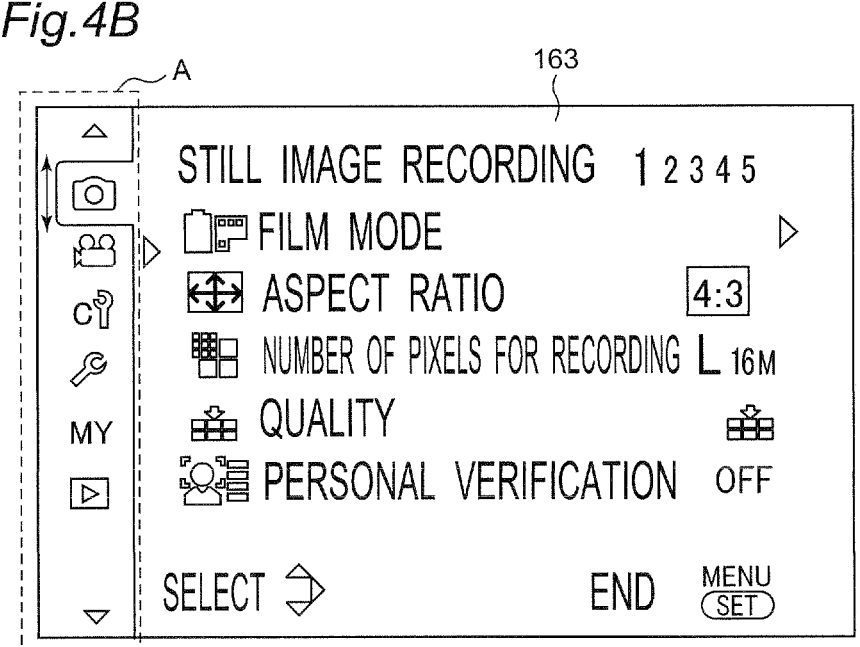
FIG. 4B shows an example of a setup menu displayed on the LCD monitor 163 of a digital camera 100 according to a first embodiment.

The camera controller 153 then changes the icon to be selected by the user according to the predetermined operation (such as pressing the up button or down button) performed on the cross button 170a or 204a in the setup menu screen shown in FIG. 4B. For example, when the down button of the cross button 170a or 204a is pressed, the camera controller 153 changes the icon denoting the selected genre as shown in the setup menu screen in FIG. 4C. When the user then performs the predetermined operation on the cross button 170a or 204a (such as pressing the right button) for determining selection of the moving image recording genre, the camera controller 153 changes the level of the setup menu down by one level, enabling itself to receive from the user a selection of a setting related to the moving image recording, such as "FILM MODE".

Figure 4C:
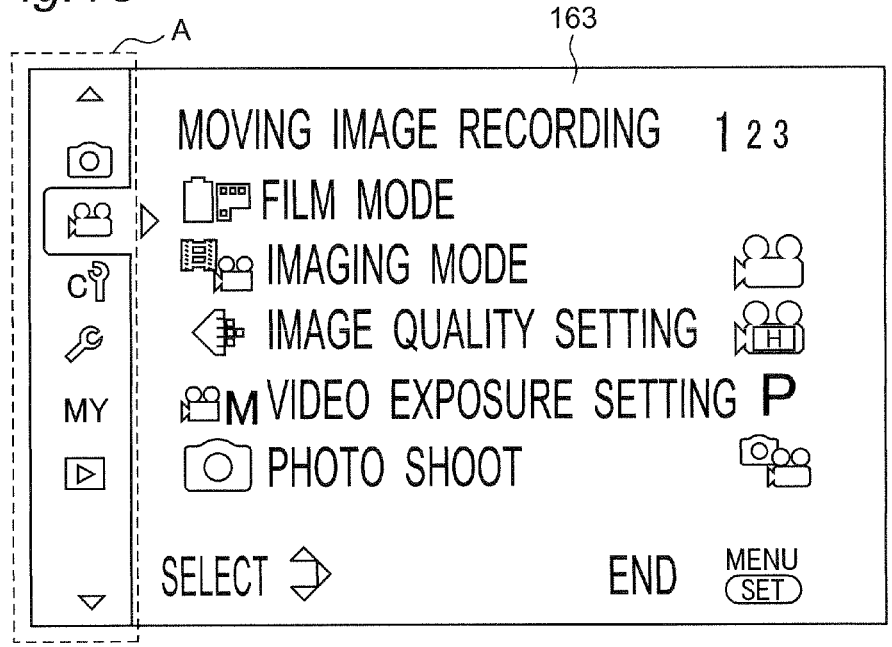
FIG. 4C shows an example of a setup menu displayed on the LCD monitor 163 of a digital camera 100 according to a first embodiment.
Figure 4D:
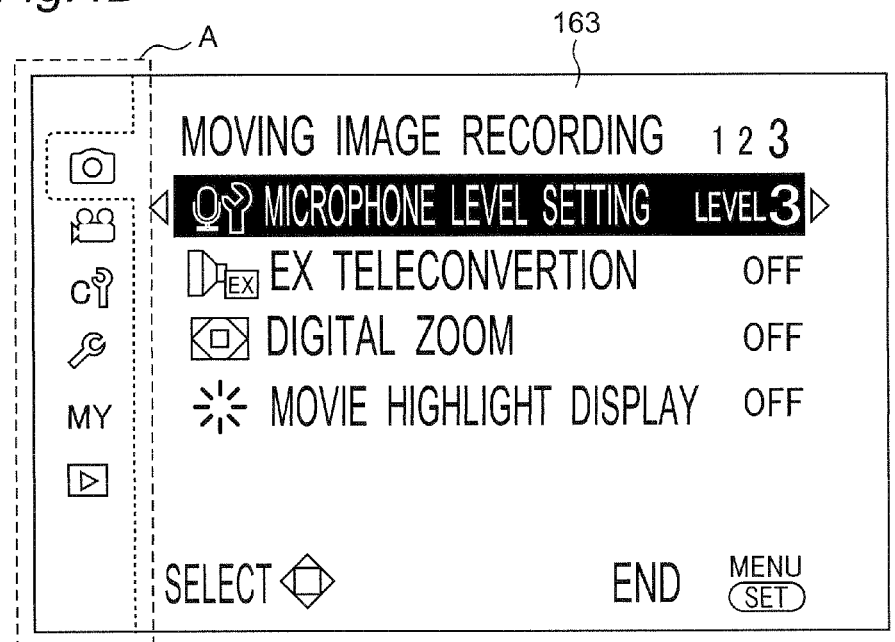
FIG. 4D shows an example of a setup menu displayed on the LCD monitor 163 of a digital camera 100 according to a first embodiment.

The user can then scroll the screen by performing a predetermined operation (such as pressing the up button or down button) on the cross button 170a or 204a in the setup menu screen shown in FIG. 4C to display the setup menu screen shown in FIG. 4D. As a result, the user can select "MICROPHONE LEVEL SETTING" corresponding to the microphone gain setting in the setup menu shown in FIG. 4D. When the user then performs the predetermined operation on the cross button 170a or 204a (such as pressing the right button) for determining the selected setting, the camera controller 153 changes the level of the setup menu down by one level, and displays the screen shown in FIG. 4E for changing the microphone gain setting on the LCD monitor 163.

Figure 4E:
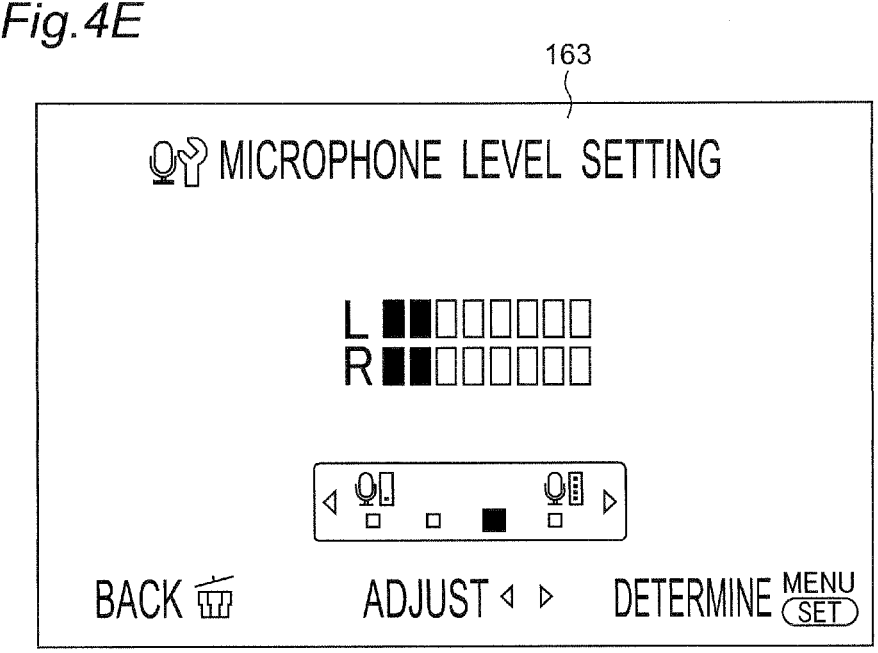
FIG. 4E shows an example of a screen displayed on the LCD monitor 163 of a digital camera 100 according to a first embodiment for setting microphone gain.

With the screen shown in FIG. 4E displayed, the camera controller 153 executes a process for changing and setting the microphone gain setting, according to the predetermined operation performed by the user on the cross button 170a or 204a (such as pressing the right button or the left button).

As described above, the user needs to follow plural setup menu screens (FIG. 4A to FIG. 4E) in order to reach the screen (FIG. 4E) for setting the microphone gain, and to perform plural operations.

On the contrary, the digital camera 100 according to this embodiment enables the user to easily perform settings related to the moving image recording without the complicated operation of changing the menu in a hierarchy of multiple menus. This operation of the digital camera 100 is described below with reference to FIG. 5 and FIG. 6.

The operating unit 170 of the camera body 102 is an example of a first operating unit. The operating unit 204 of the battery grip 103 is an example of a second operating unit. The camera controller 153 is an example of a controller. The digital camera 100 is an example of an imaging apparatus. The CMOS image sensor 150 is an example of an imaging unit.

2. Operation 2-1. Imaging operation of the digital camera 100

Figure 5:
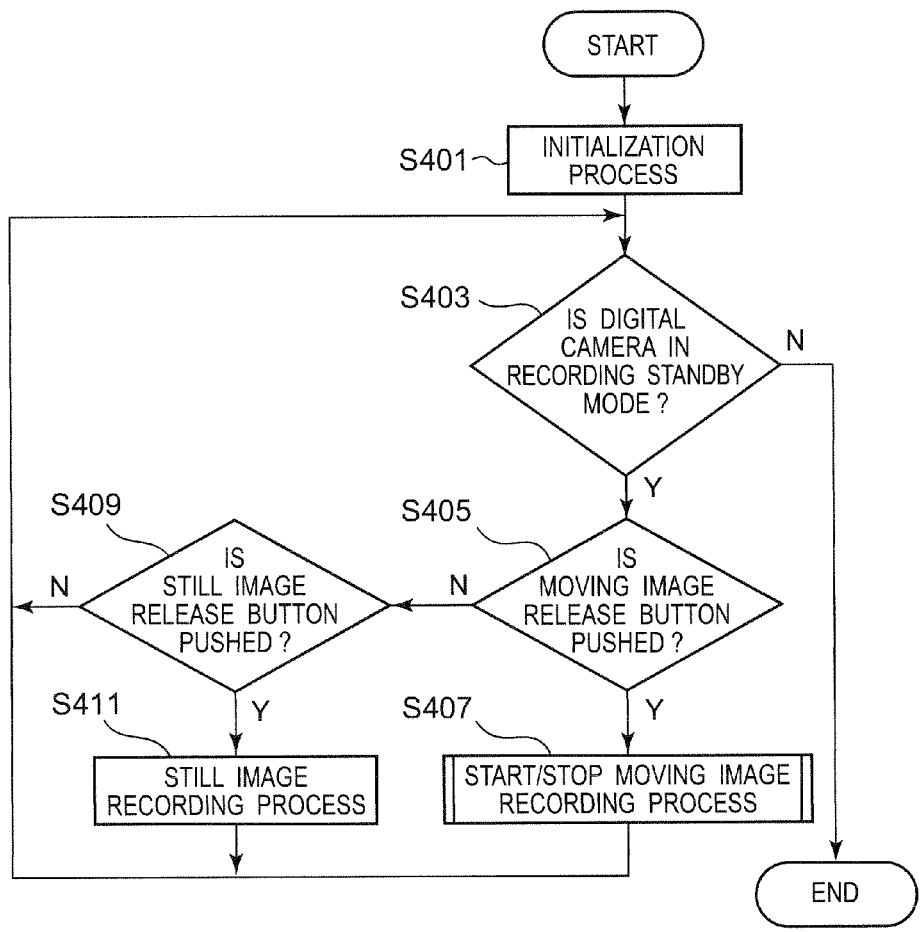
FIG. 5 is a flow chart of imaging operation control in a digital camera 100 according to a first embodiment.

The operation of the digital camera 100 having the foregoing construction is described below. FIG. 5 is a flow chart showing control of the imaging operation of the digital camera 100.

When the digital camera 100 enters the recording standby mode by the user operating the mode selection switch 166 on the camera body 102, the camera controller 153 executes an initialization process for recording a still image or moving image (S401).

After initialization ends, the camera controller 153 repeatedly performs a configuration process for confirming a user operation. In this confirmation process, the camera controller 153 repeatedly performs checking if the mode selection switch 166 on the camera body 102 is set to the recording standby mode (S403), detecting if the moving image release button 170e or 204e is pressed (S405), and detecting if the still image release button 170d or 204d is pressed (S409). When the mode selection switch 166 on the camera body 102 (S403 returns NO) is not set to the recording standby mode, the process in FIG. 5 ends.

In a case where the mode selection switch 166 on the camera body 102 is set to the recording standby mode (S403 returns YES), when the camera controller 153 detects that the moving image release button 170e or 204e of the camera body 102 or battery grip 103 is pressed (S405 returns YES), the camera controller 153 executes a start/stop moving image recording process (S407).

When the camera controller 153 detects that the still image release button 170d or 204d on the camera body 102 or battery grip 103 is pressed (S409 returns YES), the camera controller 153 executes the still image recording process (S411). More specifically, when the camera controller 153 detects that the press of the still image release button 170d or 204d by the user, the camera controller 153 records the still image generated by the image processor 172 based on the image information, which is generated by the CMOS image sensor 150 when the still image release button 170d or 204d is pressed, to the memory card 164 or other recording medium (S411).

2-2. Function Assignment Operation

Figure 6:
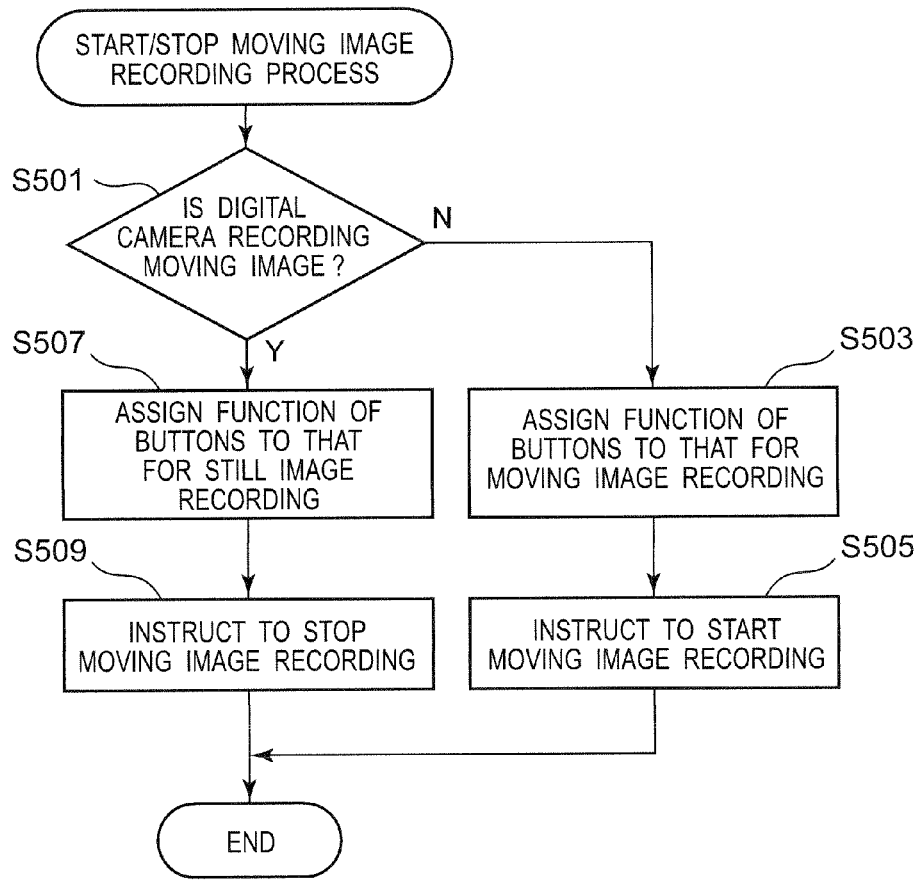
FIG. 6 is a flow chart showing the flow of the start/stop a moving image recording process of a digital camera 100 according to a first embodiment.

The start/stop moving image recording process (step S407) is described in detail next with reference to the flow chart of FIG. 6. FIG. 6 is a flow chart of the start/stop moving image recording process.

In the start/stop moving image recording process shown in FIG. 6, the camera controller 153 determines if the digital camera 100 is recording moving image, when depression of the moving image release button 170e or 204e of the camera body 102 or battery grip 103 is detected (S501).

In this embodiment, in a case where the digital camera 100 is not recording moving image, that is, in a case where the moving image recording operation has not started, the moving image recording operation is started when the user presses the moving image release button 170e or 204e of the camera body 102 or battery grip 103. In view of this, when the digital camera 100 is not recording moving image (step S501 returns NO), the camera controller 153 sets assignment of the function of the cross button 204a and rotary dial 204c of the battery grip 103 to that for the moving image recording (S503). This process assigns functions to the cross button 204a and rotary dial 204c of the battery grip 103, which are different from the functions assigned to the cross button 170a and rotary dial 170c of the camera body 102 respectively.

For example, when the shutter speed control function is assigned to the rotary dial 170c of the camera body 102, the camera controller 153 assigns the microphone gain setting function to the rotary dial 204c of the battery grip 103. In this case, when the user operates the rotary dial 204c of the battery grip 103, the microphone level setting screen shown in FIG. 4E is immediately displayed on the LCD monitor 163. As a result, the user can change the microphone gain setting by operating the rotary dial 204c of the battery grip 103, without following down the menu hierarchy to reach the desired menu by operating the operating unit 170 of the camera body 102 plural times.

The camera controller 153 then instructs the image processor 172 to start the moving image recording (S505). In response to this command, the image processor 172 performs a predetermined process to the image information generated by the CMOS image sensor 150. The processed image information is sequentially recorded, as a moving image stream, to the memory card 164 or other recording medium. The camera controller 153 performs this predetermined process and the moving image recording process until an instruction to stop the moving image recording is received due to the user again pressing the moving image release button 170e or 204e of the camera body 102 or battery grip 103.

On the other hand, in this embodiment, in a case where the digital camera 100 is recording moving image, the camera controller 153 stops the moving image recording operation when the user presses the moving image release button 170e or 204e of the camera body 102 or battery grip 103. In view of this, when the digital camera 100 is recording moving image (step S501 returns YES), the camera controller 153 assigns the function of the cross button 204a and rotary dial 204c of the battery grip 103 to a function for a still image recording (S507). This process assigns the same functions to the cross button 204a and rotary dial 204c of the battery grip 103 as the cross button 170a and rotary dial 170c of the camera body 102. As a result, the user needs to follow down the menu hierarchy as shown in FIG. 4A to FIG. 4E to set the microphone level. As a result, operation is the same when the camera body 102 is held (in the landscape mode) and when the battery grip 103 is held (in the portrait mode), and ease of use can be improved for the user. The camera controller 153 then instructs the image processor 172 to stop the moving image recording (S509).

As described above, the digital camera 100 according to this embodiment sets the function of the cross button 204a and rotary dial 204c of the battery grip 103 to a function related to the moving image recording when the moving image recording starts. A function related to the moving image recording corresponding to a setting to be set by a lower menu in the menu hierarchy is assigned to the cross button 204a and rotary dial 204c of the battery grip 103 at this time. When the moving image recording ends, the function of the cross button 204a and rotary dial 204c of the battery grip 103 is set to a still image recording function. As a result, the user does not need to operate plural buttons of the operating unit 170 on the camera body 102 plural times and follow down the menu hierarchy in order to reach a predetermined menu (the microphone level setting in this example) for configuring a moving image recording setting while recording moving image. More specifically, the user can quickly set the microphone gain, for example, by operating the cross button 204a or rotary dial 204c on the battery grip 103, and the user can easily configure a setting related to the moving image recording.

3. Summary

As described above, the digital camera 100 according to this embodiment is an imaging apparatus that can change the function of the cross button 204a and rotary dial 204c of the battery grip 103 between when recording moving image and when recording still images, disposes a moving image release button (170e or 204e) for receiving commands to start and stop moving image recording to an operating unit 170 or 204, and has a camera controller 153 that changes the function of the cross button 204a or rotary dial 204c of the battery grip 103 according to whether moving image is being recorded or still images are being recorded.

As a result, while recording moving image, the camera controller 153 assigns the function of the cross button 204a and rotary dial 204c of the battery grip 103 to a function related to the moving image recording, which is different from the function related to the still image recording. As a result, a digital camera 100 that makes it easy for the user to change the microphone gain setting, for example, during the moving image recording can be provided.

Embodiment 2

In a second embodiment the digital camera 100 has a moving image recording mode of generating image data for the moving image recording, and a still image recording mode for recording still images. In the first embodiment described above, the camera controller 153 changes the function assigned to the operating unit 204 at the timing of the start and stop of the moving image recording operation. More specifically, when executing the moving image recording operation that records image data as moving image data, the camera controller 153 assigns different functions to the operating unit 170 of the camera body 102 and the operating unit 204 of the battery grip 103. When not executing the moving image recording process, the camera controller 153 assigns the same function to the operating unit 170 and operating unit 204.

In this embodiment of the disclosure, the camera controller 153 changes the function assigned to the operating unit 204 according to whether or not the digital camera 100 is in the moving image recording mode.

Figure 7:
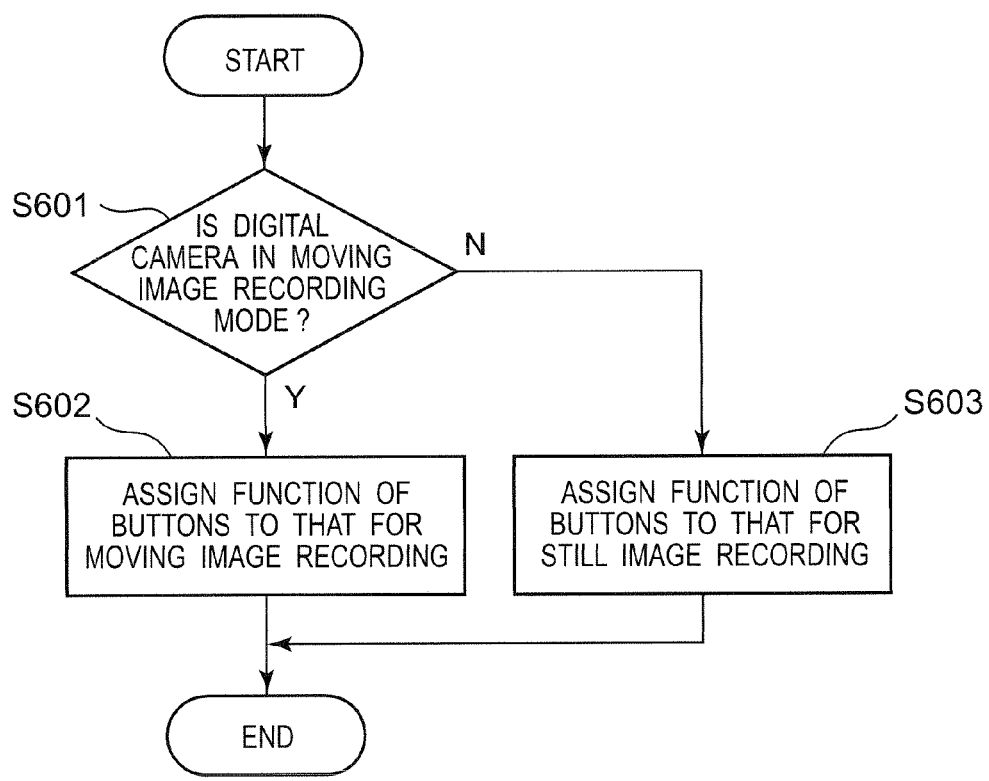
FIG. 7 is a flow chart showing a process of assigning functions to the operating units of a digital camera 100 according to a second embodiment.

The process of assigning functions to the operating units of the digital camera according to this embodiment is described with reference to FIG. 7.

The camera controller 153 first determines whether or not the digital camera 100 is in the moving image recording mode when, for example, the power is turned on or the mode selection switch 166 on the camera body 102 is operated (S601).

If the operating mode of the digital camera 100 is set to the moving image recording mode (S601 returns YES), the camera controller 153 sets the function assignment of the cross button 204a and rotary dial 204c of the battery grip 103 for the moving image recording (S602). In this example, the camera controller 153 assigns the function of the cross button 204a and rotary dial 204c to the microphone gain setting.

However, when the operating mode of the digital camera 100 is set to a mode (such as the still image recording mode) other than the moving image recording mode (S601 returns NO), the camera controller 153 sets the function assignment of the cross button 204a and rotary dial 204c of the battery grip 103 for still image recording (S603).

In this embodiment as described above, the camera controller 153 of the digital camera 100 assigns different functions to the operating unit 170 of the camera body 102 and the operating unit 204 of the battery grip 103 when the operating mode of the digital camera 100 is the moving image recording mode. When the operating mode is not the moving image recording mode, the camera controller 153 assigns the same function to the operating unit 170 of the camera body 102 and the operating unit 204 of the battery grip 103. More specifically, when the digital camera 100 is in a state for the moving image recording, the camera controller 153 of the digital camera 100 assigns different functions to the operating unit 170 of the camera body 102 and the operating unit 204 of the battery grip 103. On the other hand, when the digital camera 100 is not in a state for the moving image recording, the camera controller 153 assigns the same function to the operating unit 170 of the camera body 102 and the operating unit 204 of the battery grip 103.

As a result, in the moving image recording mode, the user can set the microphone gain, for example, by simply operating the operating unit 204 of the battery grip 103, such as the cross button 204a or rotary dial 204c, without operating a button, dial or other operator on the camera body 102 multiple times in order to follow down the menu hierarchy to reach a predetermined menu. As a result, in the moving image recording mode, the user can easily change a setting for the moving image recording.

Other Embodiments

First and second embodiments are described above as examples of the technology disclosed herein. However, the technology in this disclosure is not limited thereto, and can also be applied to other embodiments including appropriate changes, substitutions, additions, or subtractions. Other embodiments are also possible by combining elements of the first and second embodiments described above in other ways.

Examples of other embodiments are described below.

Other than the function for setting the gain of the microphone, other functions related to moving image, that could be assigned to the cross button 204a and rotary dial 204c of the battery grip 103, include but are not limited to a function for setting a frequency characteristic correction process for the input audio signal picked up by the microphone unit 161, a function for setting a directivity synthesis process for the microphone unit 161, a function for setting a noise suppression process for the input audio signal, and a function for changing the autofocus setting for the moving image recording.

As one example in the foregoing embodiments, the camera controller 153 sets the function assignment of the cross button 204a and rotary dial 204c of the battery grip 103 for a function related to the moving image recording. However, the disclosure is not limited thereto, and the function assigned to one or a plurality of buttons, dials, or other controls in the operating unit 204 of the battery grip 103 may be set for the moving image recording.

The operating units 170 and 204 of the camera body 102 and battery grip 103 in the foregoing embodiments have a cross button (170a, 204a), menu button (170b, 204b), rotary dial (170c, 204c), still image release button (170d, 204d), and moving image release button (170e, 204e). However, the disclosure is not limited thereto, and the operating units 170 and 204 of the camera body 102 and battery grip 103 may also have a mode selection button, a button for setting the white balance, a button for changing the ISO setting (sensitivity), a button for setting exposure compensation, or other buttons, dials, and operating levers, or may have any combination of such buttons, dials, and operating levers.

As described above, embodiments are described for illustrating the technology of the disclosure. To this end, the accompanying drawings and detailed description are provided.

The elements described in the accompanying drawings and detailed description therefore include, in addition to elements that are necessary to solve the problem described above, and elements that are not necessary to solve the foregoing problem but are useful for describing the technology of the disclosure. Non-essential elements are described in the accompanying drawings and detailed description should therefore not be construed to mean that the non-essential elements are essential.

The foregoing embodiments are for describing the technology disclosed by the disclosure, and changes, substitutions, additions, and subtractions within the scope of the accompanying claims and the equivalent are possible.

INDUSTRIAL APPLICABILITY

The disclosure can be applied to electronic devices that can connect to plural operating units. More specifically, the disclosure can be applied to digital cameras, movie cameras, cell phones with a camera, and electronic game devices.

The invention claimed is:
1. An imaging apparatus comprising:
an imaging unit configured to capture a subject image to generate image data;
a first operating unit configured to receive a user operation; and
a controller configured to execute a predetermined function according to an operation received by the first operating unit and an operation received by a second operating unit that is different from the first operating unit, wherein
the controller assigns different functions to the first operating unit and the second operating unit when executing a moving image recording process that records the image data as moving image, and
assigns the same function to the first operating unit and the second operating unit when not executing the moving image recording process.

2. The imaging apparatus according to claim 1, wherein
the first operating unit is disposed on a first outside surface of the imaging apparatus, and
the second operating unit is disposed on a second outside surface that is different from the first outside surface.

3. The imaging apparatus according to claim 1, wherein
the first operating unit is disposed at a first position of the imaging apparatus, and
the second operating unit is disposed at a second position which is a position rotated a predetermined angle from the first position around the optical axis of the imaging apparatus.

4. The imaging apparatus according to claim 1, wherein
when the controller assigns different functions to the first operating unit and second operating unit, the controller assigns a function related to the moving image recording to the second operating unit.

5. The imaging apparatus according to claim 4, wherein
the function related to the moving image recording assigned to the second operating unit includes at least one of a function for setting a gain of a microphone disposed to the imaging apparatus, a function for setting a frequency characteristic correction process for input audio signal picked up by the microphone, a function for setting a noise suppression process for the input audio signal, a function for setting a microphone directivity synthesis process, and a function for changing the auto-focus setting.

6. The imaging apparatus according to claim 1, wherein
the second operating unit is disposed on an outside surface of a battery unit installed to the imaging apparatus.

7. An imaging apparatus comprising:
an imaging unit configured to capture a subject image to generate image data;
a first operating unit configured to receive a user operation; and
a controller configured to execute a predetermined function according to an operation received by the first operating unit and an operation received by a second operating unit that is different from the first operating unit, wherein
the controller assigns different functions to the first operating unit and the second operating unit, in a moving image recording mode of generating the image data as moving image to be recorded, and
assigns the same function to the first operating unit and the second operating unit, in an operating mode other than the moving image recording mode.

8. The imaging apparatus according to claim 7, wherein
the first operating unit is disposed on a first outside surface of the imaging apparatus, and
the second operating unit is disposed on a second outside surface that is different from the first outside surface.

9. The imaging apparatus according to claim 7, wherein
the first operating unit is disposed at a first position of the imaging apparatus, and
the second operating unit is disposed at a second position which is a position rotated a predetermined angle from the first position around the optical axis of the imaging apparatus.

10. The imaging apparatus according to claim 7, wherein
when the controller assigns different functions to the first operating unit and second operating unit, the controller assigns a function related to the moving image recording to the second operating unit.

11. The imaging apparatus according to claim 10, wherein
the function related to the moving image recording assigned to the second operating unit includes at least one of a function for setting the gain of a microphone disposed to the imaging apparatus, a function for setting a frequency characteristic correction process for input audio signal picked up by the microphone, a function for setting a noise suppression process for the input audio signal, a function for setting a microphone directivity synthesis process, and a function for changing the auto-focus setting.

12. The imaging apparatus according to claim 7, wherein
the second operating unit is disposed on an outside surface of a battery unit installed to the imaging apparatus.

13. A function assignment method for assigning functions to a first operating unit of an imaging apparatus and a second operating unit, the imaging apparatus including an imaging unit configured to capture a subject image to generate image data, a first operating unit configured to receive a user operation, and a controller configured to execute a predetermined function according to an operation received by the first operating unit and an operation received by a second operating unit that is different from the first operating unit, the function assignment method comprising:
determining by the controller whether a moving image recording process that records the image data as moving image is executing;
assigning by the controller different functions to the first operating unit and the second operating unit when the moving image recording process that records the image data as moving image is executing; and
assigning by the controller the same function to the first operating unit and the second operating unit when the moving image recording process is not executing.

14. A function assignment method for assigning functions to a first operating unit of an imaging apparatus and a second operating unit, the imaging apparatus including an imaging unit configured to capture a subject image to generate image data, a first operating unit configured to receive a user operation, and a controller configured to execute a predetermined function according to an operation received by the first operating unit and an operation received by a second operating unit that is different from the first operating unit, the function assignment method comprising:
determining by controller whether the operating mode is set to a moving image recording mode of generating the image data as a moving image to be recorded;
assigning by the controller different functions to the first operating unit and the second operating unit when the operating mode is set to the moving image recording mode; and
assigning by the controller the same function to the first operating unit and the second operating unit when the operating mode is set to another mode different from the moving image recording mode and when the moving image recording process is not executing.

* * * * *